No. 787,336. PATENTED APR. 11, 1905.
W. A. LAYMAN.
METHOD OF OPERATING ALTERNATING CURRENT MOTORS.
APPLICATION FILED SEPT. 3, 1904.
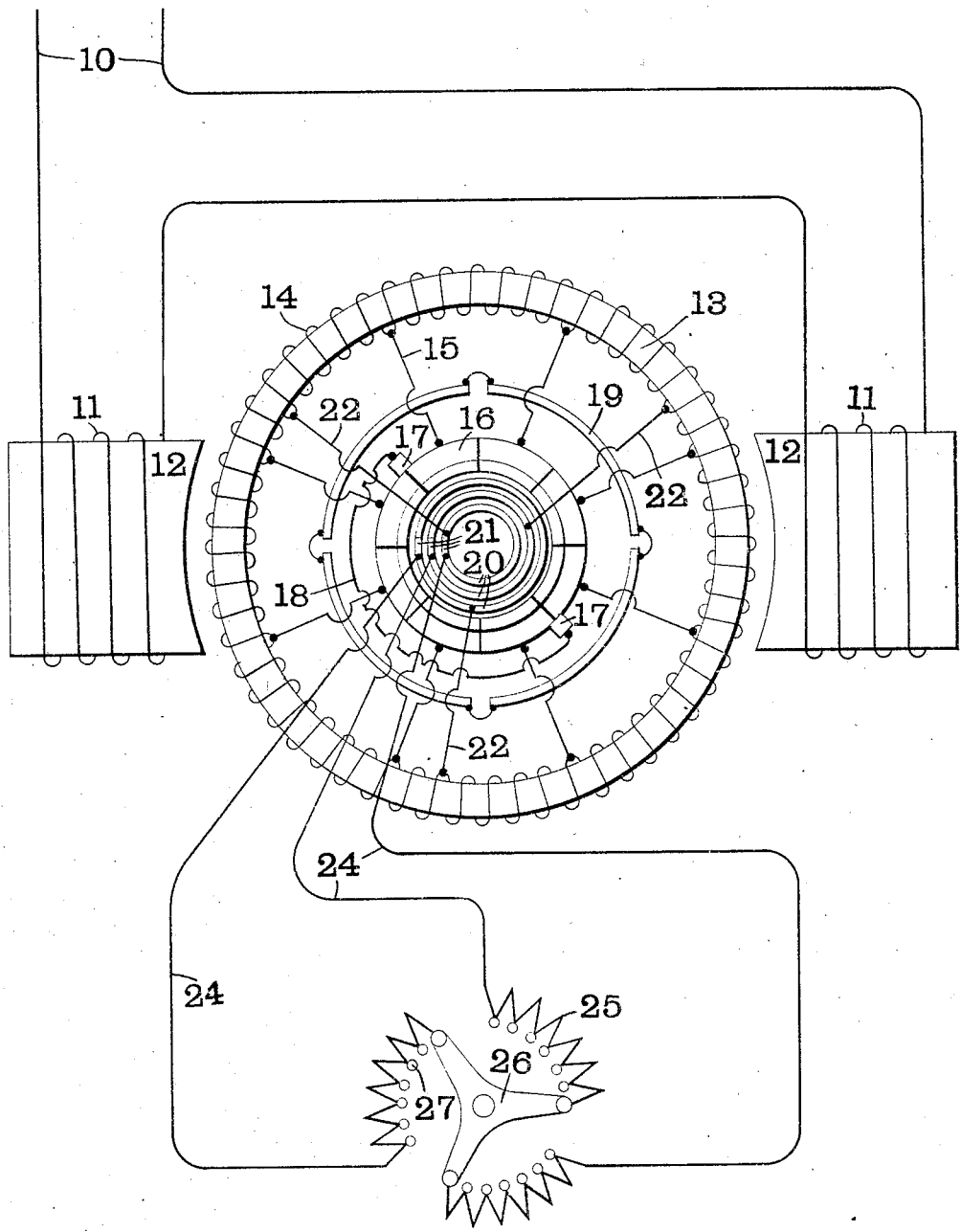
WITNESSES:
Fred. Henke.
D. C. Betjeman
INVENTOR
Waldo A. Layman.
BY
Fowler & Bryson
ATTORNEYS No. 787,336. Patented April 11, 1905.

UNITED STATES PATENT OFFICE.

WALDO A. LAYMAN, OF ST. LOUIS, MISSOURI.

METHOD OF OPERATING ALTERNATING-CURRENT MOTORS.

SPECIFICATION forming part of Letters Patent No. 787,336, dated April 11, 1905.

Original application filed December 28, 1903, Serial No. 186,848. Divided and this application filed September 3, 1904. Serial No. 223,171.

*To all whom it may concern:*

Be it known that I, WALDO A. LAYMAN, a citizen of the United States, residing at the city of St. Louis, State of Missouri, have invented a certain new and useful Method of Operating Alternating-Current Motors, of which the following is such a full, clear, and exact description as will enable any one skilled in the art to which it appertains to make and use the same, reference being had to the accompanying drawings, forming part of this specification.

My invention relates to a method of operating alternating-current electric motors, and more particularly to the operation of that type of such motors in which one of the members, preferably the rotor, is provided with means, such as a commutator, for directing the current therein to produce definite magnetic poles at starting and also with means of any suitable character for short-circuiting the individual coils of such member after starting.

I do not claim herein the apparatus here shown and described, as such is the subject-matter of my original application, Serial No. 186,848, filed December 28, 1903, renewed August 25, 1904, No. 222,136, for electric motor, of which the present application is a division relating more particularly to a method of operating such motors.

My invention therefore comprises, primarily, a method of operating an alternating-current motor, which consists in directing the current in one of the members thereof to produce definite magnetic poles, short-circuiting said member, and subsequently increasing the number of short circuits in said member.

Referring now to the accompanying drawing, which illustrates diagrammatically a motor adapted for practicing my method, 10 indicates the mains of the supply-circuit, furnishing single-phase alternating electric current to the field-coils 11, wound upon the cores 12.

13 is the armature-core, provided with the usual continuous winding 14, which is connected, by means of leads 15, with the segments of a commutator 16, upon which bear brushes 17, connected on locally-closed circuit by means of a conductor 18.

19 is a conductor-ring adapted to be clamped upon the segments of the commutator 16 to short-circuit the same in the usual way.

20 indicates three slip-rings mounted to rotate with the armature of the motor and having three brushes 21 bearing upon them. These slip-rings 20 are connected, by means of conductors 22, with three equidistant points of the armature-winding 14.

24 indicates short-circuiting conductors connected at one end to the brushes 21 and at their other ends to the three divisions 25 of a variable resistance which is preferably ohmic in character.

26 is a switch-arm the extremities of which are adapted to move over and make contact with the plates 27, connected to the resistance 25 to gradually include said resistance in or exclude it from the armature short circuit.

In carrying out my method of operating such a motor the various parts of the device may at starting be in the positions shown in the accompanying drawing, and the resistance 25 may be of any desired value. For instance, it may be of such strength that at starting ninety per cent. of the current induced in the armature-winding will flow through the conductor 18, connecting the armature-brushes, and the remaining ten per cent. of such current will flow through the resistance 25. When the motor has received its initial rotation under these conditions, the resistance 25 may be gradually excluded from the short circuit through the conductors 24 by suitably rotating the arm 26, and at the proper moment, preferably when normal running speed under load has been attained and the resistance 25 is substantially excluded, the short-circuiting ring 19 is clamped by suitable actuating means upon the commutator 16 to short-circuit the segments thereof. It will thus be seen that in the practice of my method the greater part or, if desired, all of the armature-current flows at starting through the commuted circuit and that the amount of such current passing through the short circuit 24, containing the adjustable resistance, may be gradually increased, as desired, by progressive exclusion of the resistance 25 until when normal running speed under load is approximated practically all of the armature-current will pass through circuit 24, leaving the commutator-circuit substantially inoperative. The number of short circuits in the armature is then largely increased by moving the short-circuiting ring 19 into contact with the commutator 16. The advantages of having a large number of individual short circuits in such an armature are well recognized, and it will be seen that by my method they are gradually introduced.

Having fully described my invention, what I claim as new, and desire to secure by Letters Patent of the United States, is—

1. The method of operating alternating-current motors, which consists in directing the current in one of the members thereof to produce definite magnetic poles, short-circuiting said member, and increasing the number of short circuits in said member.

2. The method of operating alternating-current motors, which consists in directing the current in one of the members thereof to produce definite magnetic poles at starting, short-circuiting said member, and increasing the number of short circuits in said member after the motor has started.

3. The method of operating alternating-current motors, which consists in directing the current in one of the members thereof to produce definite magnetic poles, gradually short-circuiting said member, and increasing the number of short circuits in said member.

4. The method of operating alternating-current motors, which consists in directing a portion of the current in one of the members thereof to produce definite magnetic poles, short-circuiting a portion of the current in said member, and then increasing the number of short circuits in said member.

5. The method of operating alternating-current motors, which consists in directing a portion of the current in one of the members thereof to produce definite magnetic poles, short-circuiting a portion of the current in said member, varying the amount of the short-circuited current, and increasing the number of short circuits in said member.

6. The method of operating alternating-current motors, which consists in directing a portion of the current in one of the members thereof to produce definite magnetic poles at starting, short-circuiting a portion of the current in said member before normal running speed is attained, varying the amount of the short-circuited current, and increasing the number of short circuits in said member when normal speed is attained.

In testimony whereof I have hereunto set my hand and affixed my seal in the presence of the two subscribing witnesses.

WALDO A. LAYMAN. [L. S.]

Witnesses:
D. C. BETJEMAN,
JAMES H. BRYSON.